(12) United States Patent
Naito et al.

(10) Patent No.: US 11,316,186 B2
(45) Date of Patent: Apr. 26, 2022

(54) FUEL CELL SYSTEM AND FUEL CELL VEHICLE

(71) Applicant: HONDA MOTOR CO., LTD., Tokyo (JP)

(72) Inventors: Hideharu Naito, Wako (JP); Kosuke Takagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 235 days.

(21) Appl. No.: 16/827,738

(22) Filed: Mar. 24, 2020

(65) Prior Publication Data

US 2020/0313220 A1  Oct. 1, 2020

(30) Foreign Application Priority Data

Mar. 28, 2019 (JP) .............................. JP2019-063632

(51) Int. Cl.
*H01M 8/2475* (2016.01)
*H01M 8/0247* (2016.01)
*B60L 50/71* (2019.01)
*B60L 50/72* (2019.01)

(52) U.S. Cl.
CPC ........... *H01M 8/2475* (2013.01); *B60L 50/71* (2019.02); *B60L 50/72* (2019.02); *H01M 8/0247* (2013.01); *H01M 2250/20* (2013.01)

(58) Field of Classification Search
CPC .......... B60L 50/71; B60L 50/72; B60L 58/33; H01M 2250/20; H01M 8/0247; H01M 8/0254; H01M 8/241; H01M 8/2475; Y02E 60/50; Y02T 90/40
See application file for complete search history.

(56) References Cited

U.S. PATENT DOCUMENTS

| | | | |
|---|---|---|---|
| 2012/0321980 A1* | 12/2012 | Goto ................... | H01M 8/0273 429/463 |
| 2014/0106254 A1* | 4/2014 | Yamano .............. | H01M 8/2465 429/465 |
| 2016/0072145 A1* | 3/2016 | Martinchek ......... | H01M 8/2404 429/457 |
| 2018/0241050 A1* | 8/2018 | Goto .................... | H01M 8/247 |
| 2020/0185740 A1* | 6/2020 | Ohm ................. | H01M 8/04223 |

\* cited by examiner

*Primary Examiner* — Adam A Arciero
(74) *Attorney, Agent, or Firm* — Amin, Turocy & Watson, LLP

(57) ABSTRACT

An outer surface of an upper wall of a stack case of a fuel cell system provided in a fuel cell vehicle includes a first outer surface, a second outer surface which is positioned closer than the first outer surface to a cell stack body, and an outer surface coupling part. Space is formed between a first upper wall of the upper wall and the cell stack body. Tabs and bus bars are disposed in the space.

8 Claims, 7 Drawing Sheets

FUEL CELL SYSTEM AND FUEL CELL VEHICLE

CROSS-REFERENCE TO RELATED APPLICATION

This application is based upon and claims the benefit of priority from Japanese Patent Application No. 2019-063632 filed on Mar. 28, 2019, the contents of which are incorporated herein by reference.

BACKGROUND OF THE INVENTION

Field of the Invention

The present invention relates to a fuel cell system including a fuel cell stack having a cell stack body formed by stacking a plurality of power generation cells each including a separator together, and a stack case accommodating the fuel cell stack. Further, the present invention relates to a fuel cell vehicle.

Description of the Related Art

In a fuel cell system of this type, the specification of U.S. Patent Application Publication No. 2016/0072145 discloses structure where a tab protruding outward is provided on an outer marginal portion of a separator.

SUMMARY OF THE INVENTION

In this regard, in the case of disposing, between a cell stack body and a cover of a stack case being located in the direction in which the tab protrudes, a bus bar for supplying to the outside electrical power generated by power generation cells, the size of the stack case tends to become large in the protruding direction of the tab (height direction). Therefore, it is likely that space outside the cover cannot effectively be utilized.

An object of the present invention is to provide a fuel cell system and a fuel cell vehicle in which it is possible to efficiently dispose a tab and a bus bar between a cover and a cell stack body, and effectively utilize space outside the cover.

According to one aspect of the present invention, a fuel cell system is provided. The fuel cell system includes a fuel cell stack and a stack case. The fuel cell stack has a cell stack body formed by stacking a plurality of power generation cells together in a stacking direction. Each of the power generation cells includes a separator. The stack case is configured to accommodate the fuel cell stack. A tab protruding outward is provided in an outer marginal portion of the separator. The power generation cell has a width direction perpendicular to the stacking direction of the cell stack body and a protruding direction in which the tab protrudes. An outer surface of a cover of the stack case located in the protruding direction in which the tab protrudes includes a first outer surface which is positioned on one end side in the width direction of the power generation cell, a second outer surface which is positioned on the other end side in the width direction of the power generation cell and which is positioned more toward the cell stack body than the first outer surface is, and an outer surface coupling part coupling the first outer surface and the second outer surface together. Space is formed between the cell stack body and a portion of the cover where the first outer surface is provided, and the tab and a bus bar configured to supply electrical power generated by the power generation cell to the outside are disposed in the space.

According to another aspect, a fuel cell vehicle is provided. The fuel cell vehicle includes the fuel cell system as described above, a front box provided on a vehicle front side of a dashboard, and a cowl top provided at an upper end of the dashboard. The fuel cell system is accommodated in the front box in a manner that the stacking direction of the cell stack body is oriented in the vehicle width direction, and the cover serves as an upper wall of the stack case. The second outer surface is positioned more rearward than the first outer surface. An upper end of the fuel cell system on the vehicle rear side is positioned below a lower end of the cowl top.

In the present invention, the second outer surface is positioned more toward the cell stack body than the first outer surface. Therefore, it is possible to form a recessed space outside the second outer surface in a manner that the second outer surface is depressed more toward the cell stack body than the first outer surface. In the structure, it is possible to effectively utilize the space outside the cover. Further, the tab and the bus bar are disposed in the space between the portion of the cover where the first outer surface is provided and the cell stack body. In the structure, it is possible to efficiently dispose the tab and the bus bar between the cover and the cell stack body.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
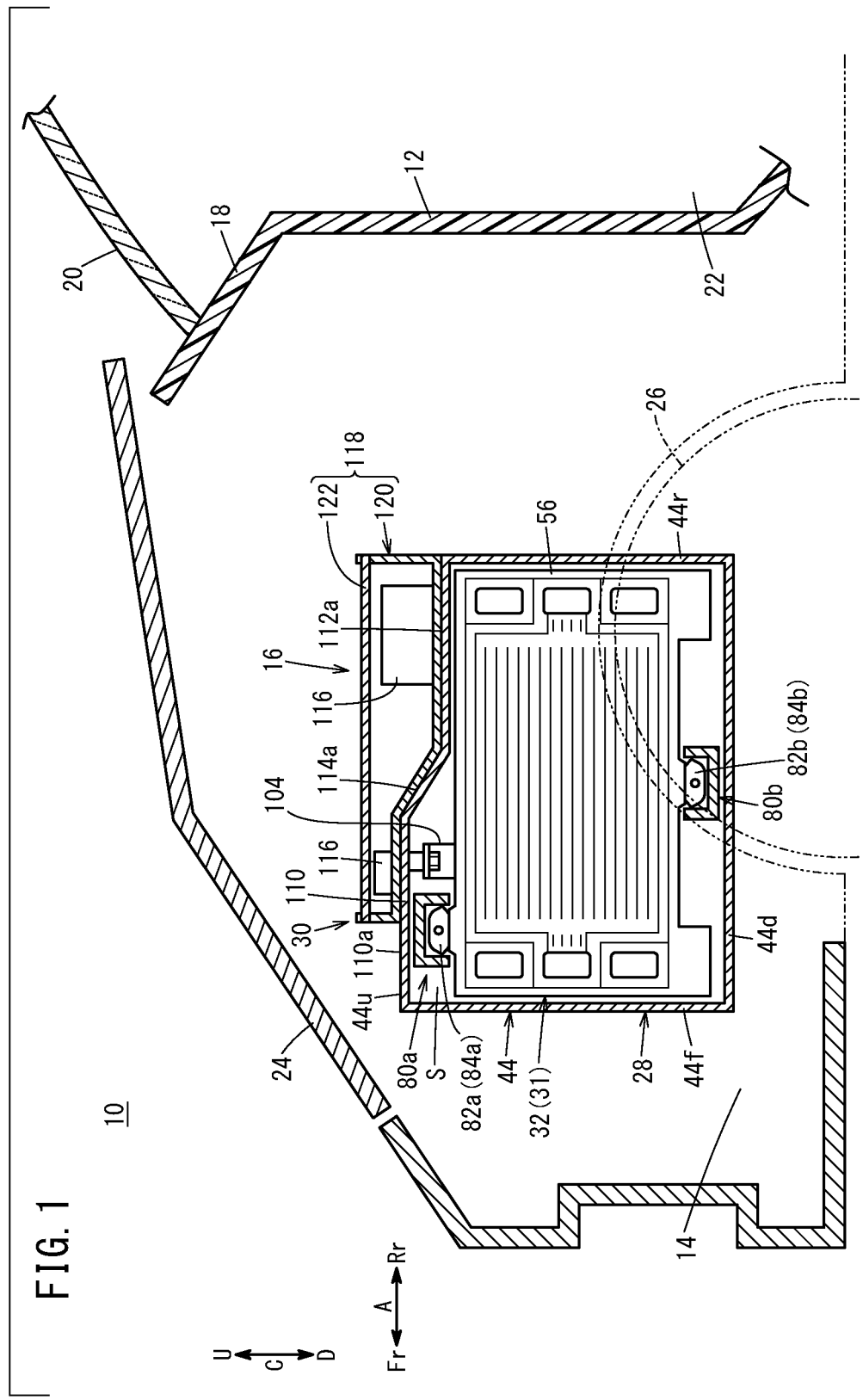
FIG. 1 is a vertical cross sectional view with partial omission, showing a fuel cell vehicle including a fuel cell system according an embodiment of the present invention.

Hereinafter, a preferred embodiment of a fuel cell system and a fuel cell vehicle according to the present invention will be described with reference to the accompanying drawings.

In the drawings, based on the fuel cell vehicle 10, as viewed from a driver of the fuel cell vehicle 10, the left side of the fuel cell vehicle 10 is denoted by an arrow "L", the right side of the fuel cell vehicle 10 is denoted by an arrow "R", the front side of the fuel cell vehicle 10 is denoted by an arrow "Fr", the rear side of the fuel cell vehicle 10 is denoted by an arrow "Rr", the upper side of the fuel cell vehicle 10 is denoted by an arrow "U", and the lower side of the fuel cell vehicle 10 is denoted by an arrow "D".

As shown in FIG. 1, a fuel cell vehicle 10 according to an embodiment of the present invention is, for example, a fuel cell electric automobile. The fuel cell vehicle 10 includes a front box 14 (motor room) provided on the vehicle front side (indicated by an arrow Fr) of a dashboard 12, and a fuel cell system 16 provided in the front box 14.

At an upper end of the dashboard 12, a cowl top 18 extends upward (in the direction indicated by an arrow U) toward the vehicle front side. The cowl top 18 supports a front end portion of a front glass 20, and stores a wiper arm (not shown). A cabin 22 is formed on the vehicle rear side (indicated by the arrow Rr) of the dashboard 12. The front box 14 can be opened or closed by a bonnet 24 with respect to the outside. The front box 14 is provided between left and right front wheels 26. A motor (not shown) for allowing the vehicle to travel is provided in the front box 14.

Figure 2:
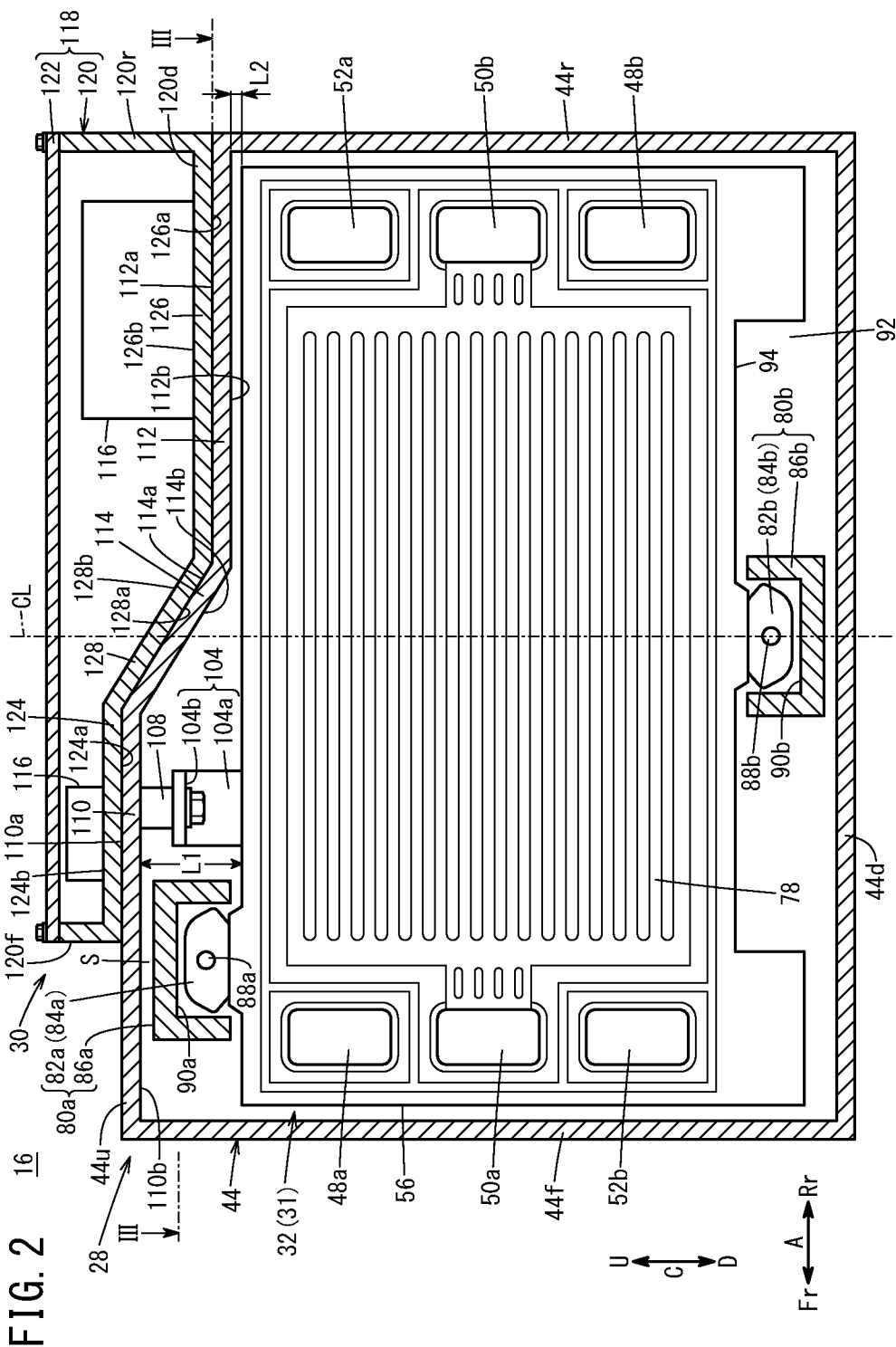
FIG. 2 is an enlarged cross sectional view showing a fuel cell system in FIG. 1.
Figure 3:
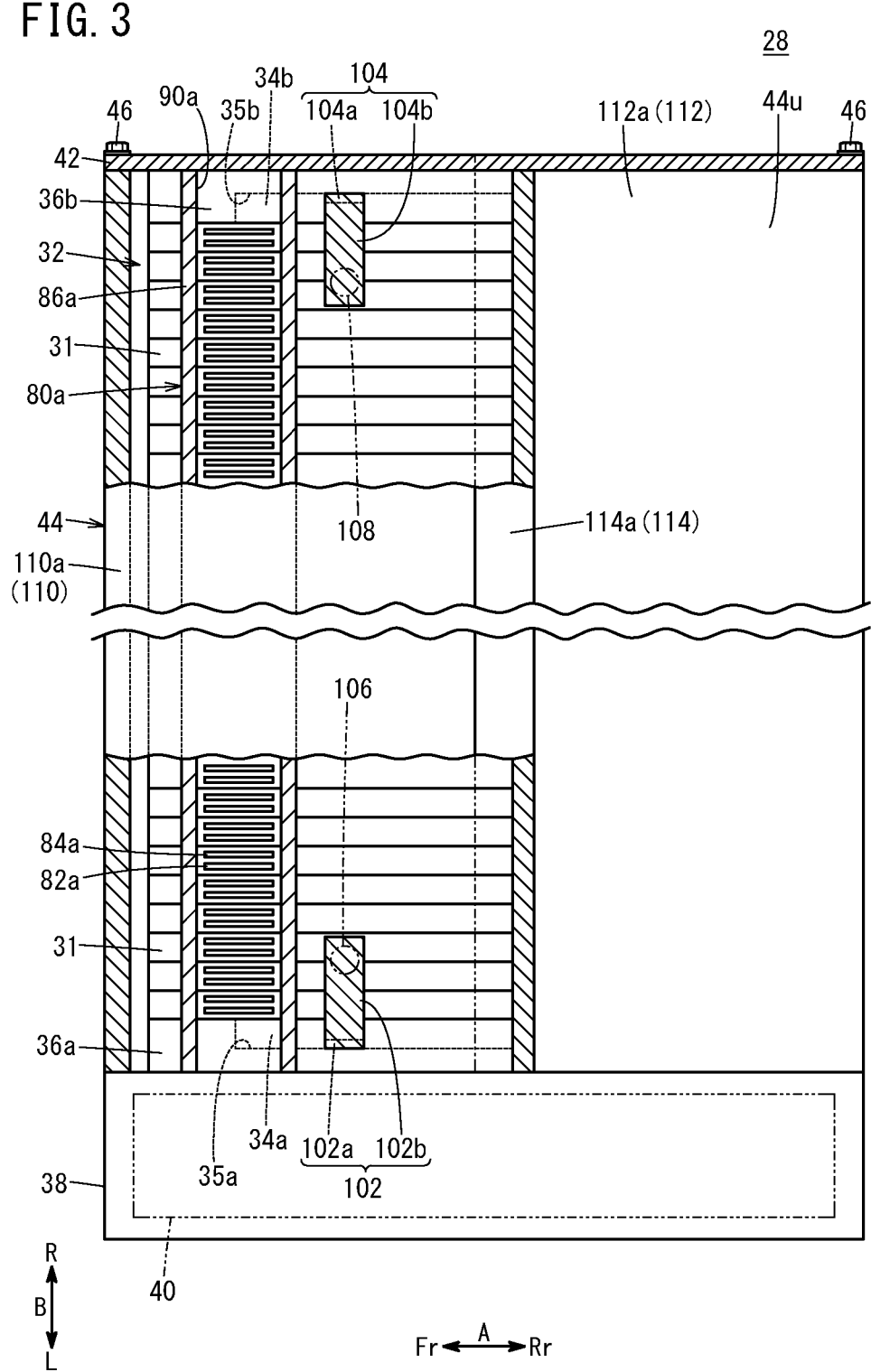
FIG. 3 is a cross sectional view with partial omission, taken along a line III-III in FIG. 2.

As shown in FIGS. 1 to 3, the fuel cell system 16 includes a fuel cell stack 28 and an electrical equipment unit 30. The fuel cell stack 28 includes a cell stack body 32 formed by stacking a plurality of power generation cells 31 together in a stacking direction. The fuel cell stack 28 is disposed in the front box 14 in a manner that the stacking direction of the cell stack body 32 is oriented in a vehicle width direction (indicated by an arrow B).

In FIG. 3, at one end of the cell stack body 32 in the stacking direction (end in a direction indicated by the arrow L), a first terminal plate 34a, a first insulating plate 36a, and an auxiliary device case 38 are provided. The first terminal plate 34a is provided in a recess 35a formed in an inner surface (surface closer to the cell stack body 32) of the first insulating plate 36a.

The auxiliary device case 38 contains a fuel cell auxiliary device 40. For example, the fuel cell auxiliary device 40 includes a fuel gas supply apparatus for supplying a fuel gas such as a hydrogen-containing gas to the cell stack body 32, and an oxygen-containing gas supply apparatus for supplying an oxygen-containing gas to the cell stack body 32.

At the other end of the cell stack body 32 (end in a direction indicated by an arrow R), a second terminal plate 34b, a second insulating plate 36b, and an end plate 42 are provided. The second terminal plate 34b is provided in a recess 35b formed in an inner surface of the second insulating plate 36b (surface closer to the cell stack body 32).

As shown in FIGS. 2 and 3, the fuel cell stack 28 includes a stack case 44 which covers the cell stack body 32, the first insulating plate 36a, and the second insulating plate 36b from the outside. The stack case 44 has a quadrangular cylindrical shape, and extends in the stacking direction of the cell stack body 32 (vehicle width direction indicated by the arrow B).

In FIG. 3, the auxiliary device case 38 is fixed to one end of the stack case 44 (end in the direction indicated by the arrow L). An end plate 42 is fixed to the other end of the stack case 44 (end in the direction indicated by an arrow R).

Specifically, the end plate 42 is fastened to an end surface of the stack case 44 located at the other end, using a plurality of fastening members 46 (bolts). In the structure, the end plate 42 applies a fastening load in the stacking direction to the cell stack body 32. Though not shown, a seal member made of elastic material is disposed between the stack case 44 and the end plate 42 over the entire periphery of joint surfaces of the stack case 44 and the end plate 42. Specific structure of the stack case 44 will be described later.

Figure 4:
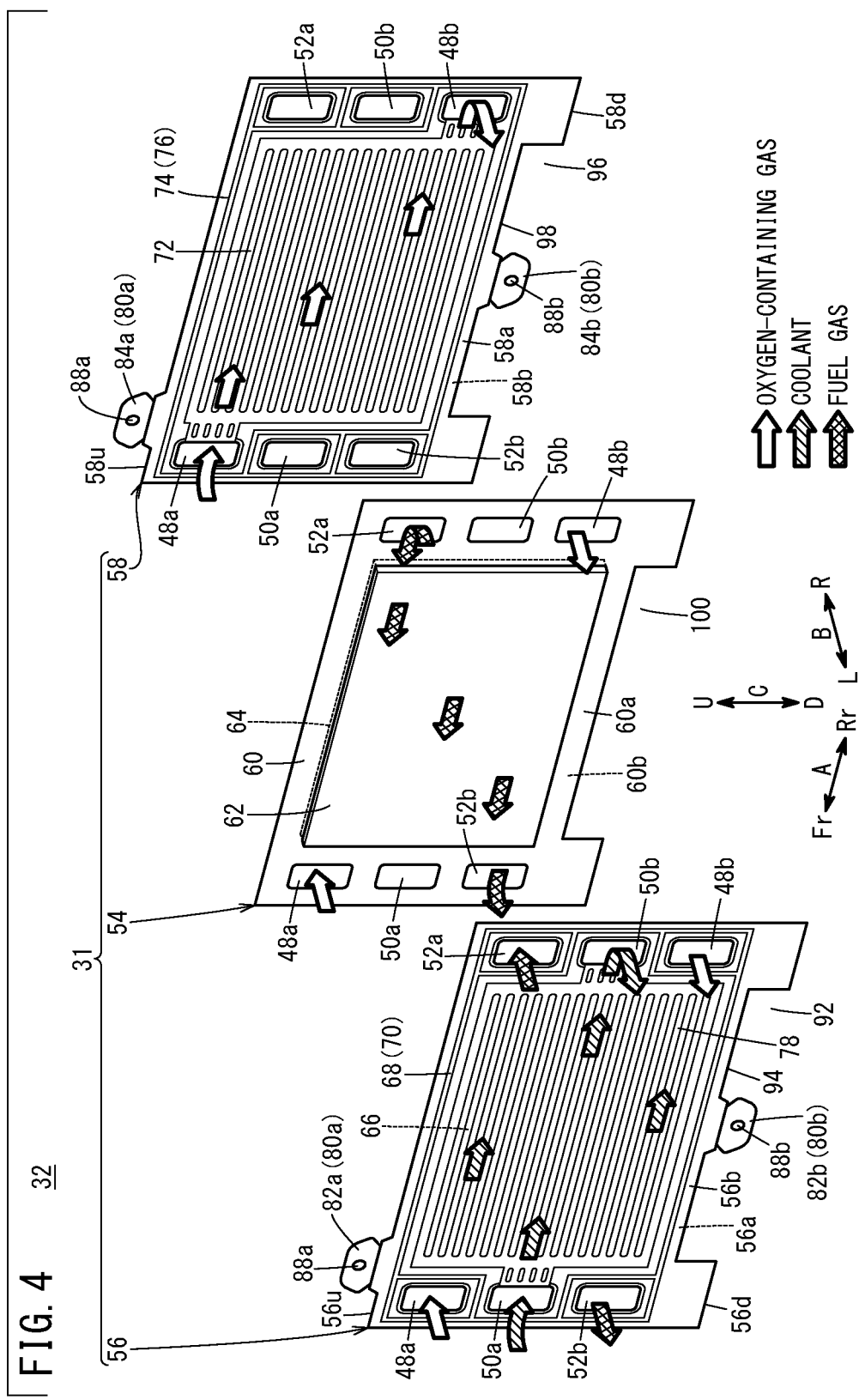
FIG. 4 is an exploded perspective view showing a power generation cell.

As shown in FIG. 4, the power generation cell 31 extends in a width direction (vehicle front/rear direction indicated by the arrow A) perpendicular to the stacking direction of the cell stack body 32 (indicated by the arrow B) and an upper/lower direction (indicated by the arrow C). Stated otherwise, the width direction of the power generation cell 31 is perpendicular to the stacking direction of the cell stack body 32 and a protruding direction in which first tabs 82a, 84b described later protrude. At one end of the power generation cell 31 in the width direction (end in the direction indicated by the arrow Fr), an oxygen-containing gas supply passage 48a, a coolant supply passage 50a, and a fuel gas discharge passage 52b are arranged in the upper/lower direction. An oxygen-containing gas is supplied through the oxygen-containing gas supply passage 48a. A coolant such as pure water, ethylene glycol, oil is supplied through the coolant supply passage 50a. A fuel gas is discharged through the fuel gas discharge passage 52b.

The oxygen-containing gas supply passage 48a extends through each of the power generation cells 31 in the stacking direction. The coolant supply passage 50a extends through each of the power generation cells 31 in the stacking direction. The fuel gas discharge passage 52b extends through each of the power generation cells 31 in the stacking direction.

At the other end of the power generation cell 31 in the width direction (end in the direction indicated by an arrow Rr), a fuel gas supply passage 52a, a coolant discharge passage 50b, and an oxygen-containing gas discharge passage 48b are arranged in the upper/lower direction. The fuel gas is supplied through the fuel gas supply passage 52a. The coolant is discharged through the coolant discharge passage 50b. The oxygen-containing gas is discharged through the oxygen-containing gas discharge passage 48b.

The fuel gas supply passage 52a extends through each of the power generation cells 31 in the stacking direction. The coolant discharge passage 50b extends through each of the power generation cells 31 in the stacking direction. The oxygen-containing gas discharge passage 48b extends through each of the power generation cells 31 in the stacking direction.

The shapes and the layout of the oxygen-containing gas supply passage 48a, the oxygen-containing gas discharge passage 48b, the fuel gas supply passage 52a, and the fuel gas discharge passage 52b, the coolant supply passage 50a, the coolant discharge passage 50b are not limited to the illustrated embodiment, and may be determined as necessary depending on the required specification.

Figure 5:
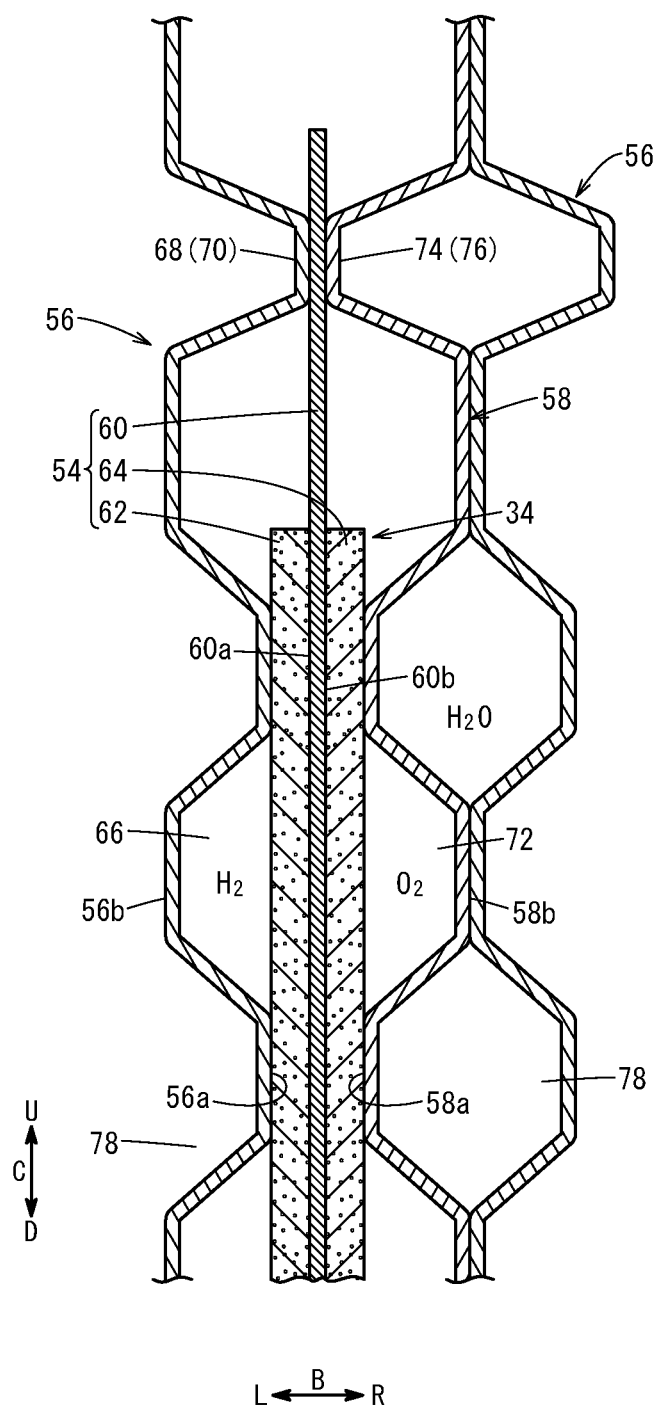
FIG. 5 is a cross sectional view with partial omission, showing the power generation cell.

As shown in FIGS. 4 and 5, the power generation cell 31 includes a membrane electrode assembly (hereinafter referred to as the "MEA 54"), and a first separator 56 and a second separator 58 disposed on both sides of the MEA 54. The MEA 54 includes an electrolyte membrane 60, an anode 62 provided on one surface 60a (oriented in the direction indicated by the arrow L) of the electrolyte membrane 60, and a cathode 64 provided on the other surface 60b (oriented in the direction indicated by the arrow R) of the electrolyte membrane 60.

For example, the electrolyte membrane 60 is a solid polymer electrolyte membrane (cation exchange membrane). For example, the sold polymer electrolyte membrane is a thin membrane of perfluorosulfonic acid containing water. The electrolyte membrane 60 is held between the anode 62 and the cathode 64. A fluorine based electrolyte may be used as the electrolyte membrane 60. Alternatively, an HC (hydrocarbon) based electrolyte may be used as the electrolyte membrane 60. The surface size (outer size) of the electrolyte membrane 60 is larger than the surface sizes of the anode 62 and the cathode 64. That is, the electrolyte membrane 60 protrudes more toward the outer peripheral side than the anode 62 and the cathode 64 do.

It should be noted that the MEA 54 may have structure where the surface size of the electrolyte membrane 60 is smaller than the surface sizes of the anode 62 and the cathode 64, and a frame shape resin film (resin frame member) is held between an outer peripheral portion of the anode 62 and the outer peripheral portion of the cathode 64.

The anode 62 includes a first electrode catalyst layer joined to one surface 60*a* of the electrolyte membrane 60, and a first gas diffusion layer stacked on the first electrode catalyst layer. The cathode 64 includes a second electrode catalyst layer joined to the other surface 60*b* of the electrolyte membrane 60, and a second gas diffusion layer stacked on the second electrode catalyst layer.

Each of the first separator 56 and the second separator 58 has a laterally elongated rectangular shape extending in the width direction (vehicle width direction indicated by the arrow A) of the power generation cell 31. Each of the first separator 56 and the second separator 58 is made of electrically conductive material. Specifically, each of the first separator 56 and the second separator 58 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment.

The first separator 56 has a fuel gas flow field 66 on its surface facing the MEA 54 (hereinafter referred to as the surface "56*a*"). The fuel gas flow field 66 communicates with the fuel gas supply passage 52*a* and the fuel gas discharge passage 52*b*. A first seal line 68 is provided on a surface 56*a* of the first separator 56. The first seal line 68 prevents leakage of fluid (the fuel gas, the oxygen-containing gas, and the coolant) to the outside.

In FIG. 5, the first seal line 68 includes a first bead seal 70 expanded from the surface 56*a* of the first separator 56 toward the MEA 54. The protruding end surface of the first bead seal 70 provides a sealing function by contacting an outer peripheral portion of the MEA 54 and being elastically deformed. Resin material may be fixed to the protruding end surface of the first bead seal 70. Further, the first seal line 68 may be an elastic rubber seal member.

As shown in FIGS. 4 and 5, the second separator 58 has an oxygen-containing gas flow field 72 on its surface (hereinafter referred to as the "surface 58*a*") facing the MEA 54. The oxygen-containing gas flow field communicates with the oxygen-containing gas supply passage 48*a* and the oxygen-containing gas discharge passage 48*b*. A second seal line 74 is provided on the surface 58*a* of the second separator 58. The second seal line 74 prevents leakage of fluid (the fuel gas, the oxygen-containing gas, and the coolant) to the outside.

In FIG. 5, the second seal line 74 includes a second bead seal 76 expanded from the surface 58*a* of the second separator 58 toward the MEA 54. The protruding end surface of the second bead seal 76 provides a sealing function by contacting an outer peripheral portion of the MEA 54 and being elastically deformed. Resin material may be fixed to the protruding end surface of the second bead seal 76. Further, the second seal line 74 may be an elastic rubber seal member.

In a state where a surface 56*b* of the first separator 56 and a surface 58*b* of the second separator 58 face and contact each other, outer ends of the first separator 56 and the second separator 58 are joined together by welding, brazing, crimpling, etc. In FIGS. 4 and 5, a coolant flow field 78 is formed between the surface 56*b* of the first separator 56 and the surface 58*b* of the second separator 58 that are adjacent to each other. The coolant flow field 78 extending in the direction indicated by the arrow A communicates with the coolant supply passage 50*a* and the coolant discharge passage 50*b*. The coolant flow field 78 is formed between the back surface of the fuel gas flow field 66 and the back surface of the oxygen-containing gas flow field 72.

As shown in FIGS. 2 to 4, the fuel cell stack 28 of this type includes a first load receiver 80*a* and a second load receiver 80*b* for receiving an external load of the power generation cells 31 in the width direction (vehicle front-rear direction).

The first load receiver 80*a* includes first tabs 82*a*, 84*a* (two tabs for each of the power generation cells 31), and a first receiver 86*a* provided to cover the first tabs 82*a*, 84*a*. The first tab 82*a* is provided in an upper marginal portion 56*u* (upper outer marginal portion) of the first separator 56.

The first tab 82*a* is provided at a position shifted toward one end (vehicle front side indicated by the arrow Fr) in the width direction (indicated by the arrow A) of the first separator 56 from the center (central line CL) in the width direction of the first separator 56. The first tab 82*a* protrudes more outward (upward) than the upper marginal portion 56*u* of the first separator 56 does.

The first tab 82*a* is in the form of a plate made of the same metal material as the first separator 56. The first tab 82*a* is joined to the upper marginal portion 56*u* of the first separator 56 by welding or brazing. A portion of the first tab 82*a* protruding above the upper marginal portion 56*u* of the first separator 56 is covered with electrically insulating material.

A positioning hole 88*a* is formed in the first tab 82*a*. A rod (not shown) for positioning each of the power generation cells 31 in a surface direction at the time of producing the fuel cell stack 28 (at the time of stacking the plurality of power generation cells 31 together) is inserted into the positioning hole 88*a*. After the plurality of power generation cells 31 are stacked together, the rod is pull out from the positioning hole 88*a*. It should be noted that the rod may be left in the positioning hole 88*a* after production of the fuel cell stack 28 finishes.

The first tab 84*a* is provided in an upper marginal portion 58*u* (upper outer marginal portion) of the second separator 58. The first tab 84*a* is provided at a position shifted toward one end (vehicle front side indicated by the arrow Fr) in the width direction (indicated by the arrow A) of the second separator 58 from the center (central line CL) in the width direction of the second separator 58. That is, the first tab 84*a* is disposed to face the first tab 82*a*. The first tab 84*a* has the same structure as the first tab 82*a* as described above. Therefore, description about specific structure of the first tab 84*a* is omitted. The first load receiver 80*a* may include only one of the first tab 82*a* and the first tab 84*a*.

As shown in FIG. 3, the first receiver 86*a* is a support bar extending in the stacking direction (vehicle width direction indicated by the arrow B) of the cell stack body 32. One end (end in the direction indicated by the arrow L) of the first receiver 86*a* is fixed to the auxiliary device case 38. The other end (end in the direction indicated by the arrow R) of the first receiver 86*a* is fixed to the end plate 42. The other end of the first receiver 86*a* may be attached to the end plate 42 in the state where the other end of the first receiver 86*a* is movable in the stacking direction.

In FIG. 2, a first accommodation recess 90*a* is formed in the first receiver 86*a*. The first tab 82*a* is accommodated in the first accommodation recess 90*a*. The first accommodation recess 90*a* is opened downward (in a direction indicated by an arrow D). That is, the first receiver 86*a* has an inverted U-shape in cross section.

As shown in FIGS. 2 and 4, the second load receiver 80b includes second tabs 82b, 84b (two tabs for each of the power generation cells 31), and a second receiver 86b provided to cover the second tabs 82b, 84b. The second tab 82b is provided in a lower marginal portion 56d (lower outer marginal portion) of the first separator 56.

Specifically, a first recess 92 depressed upward (toward the first tab 82a) is formed at the central part in a direction in which the lower marginal portion 56d of the first separator 56 extends. The second tab 82b is provided at a first bottom 94 forming the first recess 92. The second tab 82b is positioned on the central line CL in the width direction (indicated by the arrow A) of the first separator 56. The second tub 82b protrudes more outward (upward) than the first bottom 94 of the first separator 56 does.

The second tab 82b is in the form of a plate made of the same metal material as the first separator 56. The second tab 82b is joined to the first bottom 94 of the first separator 56 by welding or brazing. A portion of the second tab 82b protruding below the first bottom 94 of the first separator 56 is covered with electrically insulating material.

A positioning hole 88b is formed in the second tab 82b. A rod (not shown) for positioning each of the power generation cells 31 in a surface direction at the time of producing the fuel cell stack 28 (at the time of stacking the plurality of power generation cells 31 together) is inserted into the positioning hole 88b. After the plurality of power generation cells 31 are stacked together, the rod is pull out from the positioning hole 88b. It should be noted that the rod may be left in the positioning hole 88b after production of the fuel cell stack 28 finishes.

The second tab 84b is provided in a lower marginal portion 58d (lower outer marginal portion) of the second separator 58. Specifically, a second recess 96 depressed upward (toward the first tab 84a) is formed at the central part in a direction in which the lower marginal portion 58d of the second separator 58 extends. The second tab 84b is provided at a second bottom 98 forming the second recess 96. The second recess 96 communicates with the first recess 92 of the first separator 56 through a third recess 100 that is depressed upward and formed at the central part in a direction in which the lower marginal portion of the electrolyte membrane 60 extends.

The second tab 84b is positioned on the central line CL in the width direction (indicated by the arrow A) of the second separator 58. The second tab 84b protrudes more outward (downward) than the second bottom 98 of the second separator 58 does. The second tab 84b has the same structure as the second tab 82b described above. Therefore, description about specific structure of the second tab 84b is omitted. The second load receiver 80b may include only one of the second tab 82b and the second tab 84b.

As shown in FIG. 2, the second receiver 86b is a support bar extending in the stacking direction of the cell stack body 32 (vehicle width direction). One end (end in the direction indicated by the arrow L) of the second receiver 86b is fixed to the auxiliary device case 38. The other end (end in the direction indicated by the arrow R) of the second receiver 86b is fixed to the end plate 42. The other end of the second receiver 86b may be attached to the end plate 42 in the state where the other end of the second receiver 86b is movable in the stacking direction.

A second accommodation recess 90b is formed in the second receiver 86b. The second tab 82b is accommodated in the second accommodation recess 90b. The second accommodation recess 90b is opened upward (in a direction indicated by the arrow U). That is, the second receiver 86b has a U-shape in cross section. The second receiver 86b is positioned inside the first recess 92, the second recess 96, and the third recess 100.

In FIGS. 2 and 3, the fuel cell stack 28 includes a first bus bar 102 and a second bus bar 104 for supplying electrical power generated by the power generation cells 31 to the electrical equipment unit 30.

The first bus bar 102 is a band shaped metal plate, and provided at a position shifted toward one end (indicated by the arrow Fr) in the width direction (indicated by the arrow A) of the power generation cells 31 from the center in the width direction of the power generation cells 31. The first tabs 82a, 84b are located more toward one end (the direction indicated by the arrow Fr) of the power generation cells 31 than the first bus bar 102 is.

The first bus bar 102 includes a first extension part 102a protruding upward from the first terminal plate 34a to penetrate through the outer peripheral portion of the first insulating plate 36a, and a second extension part 102b extending from an extended end of the first extension part 102a inward in the stacking direction (indicated by the arrow R). The extended end of the second extension part 102b is electrically connected to an input terminal (not shown) of the electrical equipment unit 30 by a first connector part 106.

In FIG. 3, the second bus bar 104 is a band shaped metal plate, and provided at a position shifted toward one end (indicated by the arrow Fr) in the width direction (indicated by the arrow A) of the power generation cells 31 from the center in the width direction of the power generation cells 31. The first tabs 82a, 84b are located more toward one end (direction indicated by the arrow Fr) of the power generation cells 31 than the second bus bar 104 is.

The second bus bar 104 includes a first extension part 104a protruding upward from the second terminal plate 34b to penetrate through the outer peripheral portion of the second insulating plate 36b, and a second extension part 104b extending from an extended end of the second extension part 104b inward in the stacking direction (indicated by the arrow L). The extended end of the second extension part 104b is electrically connected to an input terminal (not shown) of the electrical equipment unit 30 by a second connector part 108. The first bus bar 102 and the second bus bar 104 have the same shape.

As shown in FIG. 2, the stack case 44 includes a lower wall 44d, a front wall 44f, a rear wall 44r, and an upper wall 44u. The stack case 44 is in the form of a one-piece structural object formed by extrusion. The stack case 44 may be formed by molding the lower wall 44d, the front wall 44f, the rear wall 44r, and the upper wall 44u as separate components and joining the lower wall 44d, the front wall 44f, the rear wall 44r, and the upper wall 44u together.

The lower wall 44d covers the cell stack body 32 from below (in the direction indicated by the arrow D). The lower wall 44d is spaced from each of the cell stack body 32 and the second receiver 86b. The front wall 44f extends upward from the front end of the lower wall 44d, and covers the cell stack body 32 from the vehicle front side (the direction indicated by the arrow Fr). The front wall 44f is spaced from the cell stack body 32. The rear wall 44r extends upward from the rear end of the lower wall 44d, and covers the cell stack body 32 from the vehicle rear side (indicated by the arrow Rr). The rear wall 44r is spaced from the cell stack body 32. The upper end of the rear wall 44r is positioned below the upper end of the front wall 44f.

The upper wall 44u couples the upper end of the front wall 44f and the upper end of the rear wall 44r together, and covers the cell stack body 32 from above (the direction indicated by the arrow U). The upper wall 44u is spaced upward from the cell stack body 32. The upper wall 44u is a cover, and the first tabs 82a, 84a protrude toward the upper wall 44u in the protruding direction (the upper wall 44u is positioned above the first tabs 82a, 84a).

The upper wall 44u includes a first upper wall 110 positioned on one end side (the front wall 44f side) in the width direction of the power generation cells 31, a second upper wall 112 positioned on the other end side (the rear wall 44r side) in the width direction of the power generation cells 31, and an upper coupling part 114 coupling the first upper wall 110 and the second upper wall 112 together. The second upper wall 112 is positioned more downward than the first upper wall 110 (toward the cell stack body 32 side). The upper coupling part 114 is inclined downward and continuously straight from the first upper wall 110 up to the second upper wall 112.

The length of the first upper wall 110 in the direction indicated by the arrow A is substantially the same as the length of the second upper wall 112 in the direction indicated by the arrow A. The upper coupling part 114 is positioned at substantially the center of the upper wall 44u in the direction indicated by the arrow A. It should be noted that the length of the first upper wall 110 and the length of the second upper wall 112 in the direction indicated by the arrow A may be determined as necessary, and may be different from each other. Further, the upper coupling part 114 may be positioned off the central portion of the upper wall 44u in the direction indicated by the arrow A. Each of the first upper wall 110, the second upper wall 112, and the upper coupling part 114 extends the entire length of the stack case 44 in the direction indicated by the arrow B (see FIG. 3).

The outer surface of the upper wall 44u includes a first outer surface 110a as an upper surface of the first upper wall 110, a second outer surface 112a as an upper surface of the second upper wall 112, and an outer surface coupling part 114a coupling the first outer surface 110a and the second outer surface 112a together. Each of the first outer surface 110a and the second outer surface 112a is a flat surface extending substantially horizontally in the vehicle front-rear direction (indicated by the arrow A). The outer surface coupling part 114a is an upper surface of the upper coupling part 114. The outer surface coupling part 114a is an inclined surface inclined downward and continuously straight from the first outer surface 110a to the second outer surface 112a.

The inner surface of the upper wall 44u includes a first upper wall inner surface 110b as a lower surface of the first upper wall 110, a second upper wall inner surface 112b as a lower surface of the second upper wall 112, and an upper wall inner surface coupling part 114b coupling the first upper wall inner surface 110b and the second upper wall inner surface 112b together. Each of the first upper wall inner surface 110b and the second upper wall inner surface 112b is a flat surface extending substantially horizontally in the vehicle front-rear direction (indicated by the arrow A). The upper wall inner surface coupling part 114b is an inclined surface inclined downward and continuously straight from the first upper wall inner surface 110b to the second upper wall inner surface 112b. The second outer surface 112a is positioned below the first upper wall inner surface 110b.

Space S is formed between the first upper wall inner surface 110b (first upper wall 110) and the cell stack body 32. The first tabs 82a, 84a and the first bus bar 102 and the second bus bar 104 are disposed in the space S. The spacing distance L1 between the first upper wall inner surface 110b and the cell stack body 32 is larger than the spacing distance L2 between the second upper wall inner surface 112b and the cell stack body 32. The first upper wall inner surface 110b is spaced from each of the first receiver 86a, the first bus bar 102, and the second bus bar 104.

The electrical equipment unit 30 is disposed on the outer surface of the upper wall 44u of the stack case 44. The electrical equipment unit 30 includes a unit body 116, and a unit case 118 accommodating the unit body 116. For example, the unit body 116 includes a contactor (switch). The first bus bar 102 is electrically connected to the unit body 116 through a first connector part 106, and the second bus bar 104 is electrically connected to the unit body 116 through a second connector part 108.

The unit case 118 includes a case body 120 opened upward (opposite to the fuel cell stack 28), and a lid 122 which closes an upper opening of the case body 120. The case body 120 includes a front wall 120f, a rear wall 120r, and a lower wall 120d.

The front wall 120f is positioned more rearward (direction indicated by the arrow Rr) than the front wall 44f of the stack case 44. The front end of the front wall 120f (one end of the unit case 118 in the direction indicated by the arrow Fr) is positioned more rearward than the front end (one end in the direction indicted by the arrow Fr) of the first tabs 82a, 84a. Stated otherwise, the front end of the front wall 120f is positioned above the first tabs 82a, 84a.

The rear wall 120r is positioned above the rear wall 44r of the stack case 44. The rear wall 120r may be positioned more toward the vehicle front side or the vehicle rear side than the rear wall 44r of the stack case 44. The front wall 120f and the rear wall 120r are coupled together by a side wall (not shown).

The lower wall 120d is formed to have a shape corresponding to the upper wall 44u of the stack case 44. That is, the lower wall 120d includes a first lower wall 124 positioned on one end side (side indicated by the arrow Fr) in the width direction of the power generation cells 31, a second lower wall 126 positioned on the other end side (side indicated by the arrow Rr) in the width direction of the power generation cells 31, and a lower coupling part 128 coupling the first lower wall 124 and the second lower wall 126 together.

The second lower wall 126 is positioned below the first lower wall 124 (more toward the fuel cell stack 28 side). The lower coupling part 128 is inclined downward and continuously straight from the first lower wall 124 up to the second lower wall 126. Each of the first lower wall 124, the second lower wall 126, and the lower coupling part 128 extends the entire length of the unit case 118 in the direction indicated by the arrow B.

The outer surface of the lower wall 120d faces the outer surface of the stack case 44. The outer surface of the lower wall 120d includes a first contact surface 124a which contacts the first outer surface 110a of the stack case 44, a second contact surface 126a which contacts the second outer surface 112a of the stack case 44, and a contact surface coupling part 128a which couples the first contact surface 124a and the second contact surface 126a together. The first contact surface 124a is a lower surface of the first lower wall 124. The second contact surface 126a is a lower surface of the second lower wall 126. The contact surface coupling part 128a is a lower surface of the lower coupling part 128.

Each of the first contact surface 124a and the second contact surface 126a is a flat surface extending substantially horizontally in the vehicle front-rear direction. The second contact surface 126a and the second outer surface 112a are positioned on the vehicle rear side of the first contact surface 124a and the first outer surface 110a. The contact surface coupling part 128a is an inclined surface inclined downward and continuously straight from the first contact surface 124a up to the second contact surface 126a. The contact surface coupling part 128a contacts the outer surface coupling part 114a. The contact surface coupling part 128a may be spaced from the outer surface coupling part 114a.

The inner surface of the lower wall 120d includes a first lower wall inner surface 124b as an upper surface of the first lower wall 124, a second lower wall inner surface 126b as an upper surface of the second lower wall 126, and a lower wall inner surface coupling part 128b coupling the first lower wall inner surface 124b and the second lower wall inner surface 126b together. Each of the first lower wall inner surface 124b and the second lower wall inner surface 126b is a flat surface extending substantially horizontally in the vehicle front-rear direction. The lower wall inner surface coupling part 128b is an inclined surface inclined downward and continuously straight from the first lower wall inner surface 124b up to the second lower wall inner surface 126b. The second lower wall inner surface 126b is positioned below the first contact surface 124a.

A lid 122 of the unit case 118 extends in a substantially horizontal direction. The distance between the lid 122 and the second lower wall inner surface 126b is larger than the distance between the lid 122 and the first lower wall inner surface 124b. In the structure, it is possible to suppress the height of the fuel cell system 16, and comparatively increase the capacity in the unit case 118. The upper end of the unit case 118 is positioned below the lower end of the cowl top 18 (see FIG. 1).

In this case, the fuel cell system 16 and the fuel cell vehicle 10 according to the embodiment of the present invention offer the following advantages.

In the fuel cell system 16, the outer surface of the upper wall 44u of the stack case 44 which covers the first tabs 82a, 84a includes the first outer surface 110a which is positioned on one end side in the width direction of the power generation cells 31, the second outer surface 112a which is positioned on the other end side in the width direction of the power generation cells 31 and which is positioned more toward the cell stack body 32 than the first outer surface 110a is, and the outer surface coupling part 114a coupling the first outer surface 110a and the second outer surface 112a together. The space S is formed between the cell stack body 32 and the first upper wall 110 of the upper wall 44u where the first outer surface 110a is provided. The first tabs 82a, 84a and the first bus bar 102 and the second bus bar 104 configured to supply electrical power generated by the power generation cells 31 to the outside are disposed in the space S.

In the structure, the second outer surface 112a is positioned more toward the cell stack body 32 than the first outer surface 110a is. In the structure, it is possible to form recessed space outside the second outer surface 112a in a manner that the recessed space is depressed more toward the cell stack body 32 than the first outer surface 110a. In the structure, it is possible to effectively utilize the space outside the upper wall 44u. Further, the first tabs 82a, 84a, the first bus bar 102, and the second bus bar 104 are disposed in the space S between the first upper wall 110 and the cell stack body 32. In the structure, it is possible to efficiently dispose the first tabs 82a, 84a, the first bus bar 102, and the second bus bar 104 in the space S between the first upper wall 110 and the cell stack body 32.

The fuel cell system 16 includes the electrical equipment unit 30 provided on the upper wall 44u. The electrical equipment unit 30 includes the unit body (116) electrically connected to the first bus bar 102 and the second bus bar 104, and the unit case 118 that is disposed on the upper wall 44u and accommodates the unit body 116. The surface of the unit case 118 facing the upper wall 44u includes the first contact surface 124a configured to be in contact with the first outer surface 110a, the second contact surface 126a configured to be in contact with the second outer surface 112a, and the contact surface coupling part 128a configured to couple the first contact surface 124a and the second contact surface 126a together.

In the structure, it is possible to efficiently dispose the electrical equipment unit 30 on the outer surface of the upper wall 44u of the stack case 44.

The outer surface coupling part 114a comprises the inclined surface inclined continuously toward the cell stack body 32 from the first outer surface 110a to the second outer surface 112a.

In the structure, it is possible to comparatively increase the space outside the outer surface coupling part 114a.

The first tabs 82a, 84a, the first bus bar 102, and the second bus bar 104 are provided at positions shifted toward one end in the width direction of the power generation cells 31 from the center in the width direction of the power generation cells 31.

In the structure, it is possible to efficiently dispose the first tabs 82a, 84a, the first bus bar 102, and the second bus bar 104 in the space S between the first upper wall 110 of the stack case 44 and the cell stack body 32.

The first tabs 82a, 84a are located at positions more toward one end in the width direction of the power generation cells 31 than the first bus bar 102 and the second bus bar 104 are. One end of the unit case 118 in the width direction of the power generation cells 31 (end in the direction indicated by the arrow Fr) is located more toward the first bus bar 102 and the second bus bar 104 than one end of the first tabs 82a, 84a in the width direction of the power generation cells 31 (end in the direction indicated by the arrow Fr) is.

In the structure, it is possible to form the unit case 118 to have a compact size.

The first recess 92 depressed toward the first tab 82a is formed in the lower marginal portion 56d of the first separator 56 opposite to the first tab 82a. The first bottom 94 of the first recess 92 is provided with the second tab 82b protruding in the direction (downward) opposite to the direction in which the first tab 82a protrudes. The second recess 96 depressed toward the first tab 84a is formed in the lower marginal portion 58d of the second separator 58 opposite to the first tab 84a. The second bottom 98 of the second recess 96 is provided with the second tab 84b protruding in the direction (downward) opposite to the direction in which the first tab 84a protrudes.

In the structure, it is possible to form the fuel cell stack 28 to have a compact size.

The fuel cell vehicle 10 includes the fuel cell system 16 as described above, the front box 14 provided on the vehicle front side of the dashboard 12, and the cowl top 18 provided at the upper end of the dashboard 12. The fuel cell system 16 is accommodated in the front box 14 in a manner that the stacking direction of the cell stack body 32 is oriented in the vehicle width direction. The second outer surface 112a is positioned more rearward than the first outer surface 110a is, and the upper end of the fuel cell system 16 (unit case 118)

on the vehicle rear side is positioned more downward than the lower end of the cowl top 18.

Figure 6:
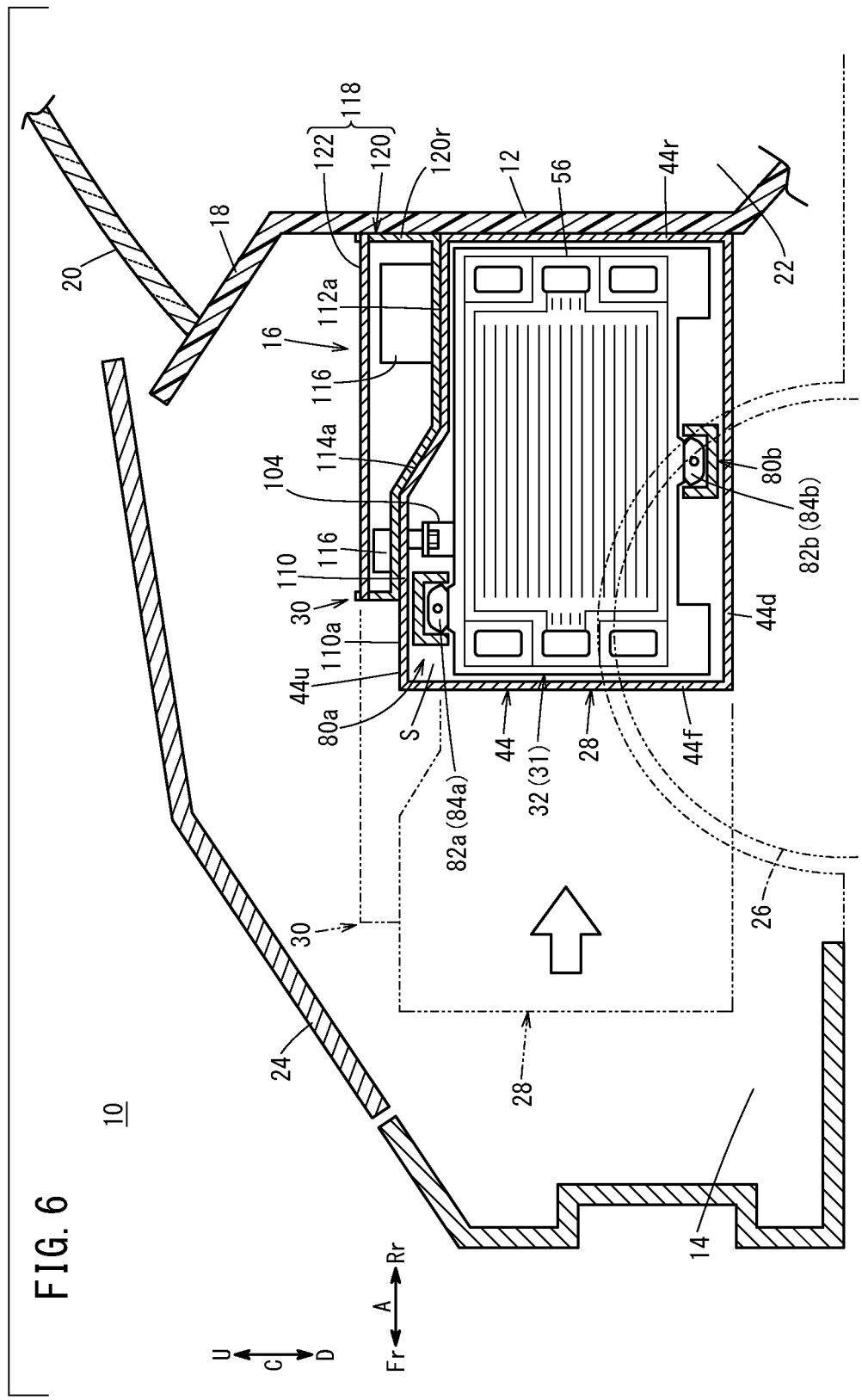
FIG. 6 is a view illustrating movement of a fuel cell system at the time of collision of the fuel cell vehicle.

When collision (e.g., front collision) of the fuel cell vehicle 10 having the above structure occurs, as shown in FIG. 6, the fuel cell system 16 moves in the front box 14 rearward relative to the vehicle body. Then, the rear surface of the fuel cell system 16 (the rear wall 44*r* of the stack case 44 and the rear wall 120*r* of the unit case 118) are brought into contact with, or move closer to the dashboard 12. At this time, the fuel cell system 16 does not interfere with the cowl top 18. Therefore, it is possible to prevent the situation where, when collision of the fuel cell vehicle 10 occurs, the fuel cell system 16 is brought into contact with the cowl top 18 and causes damage to the front glass 20.

Figure 7:
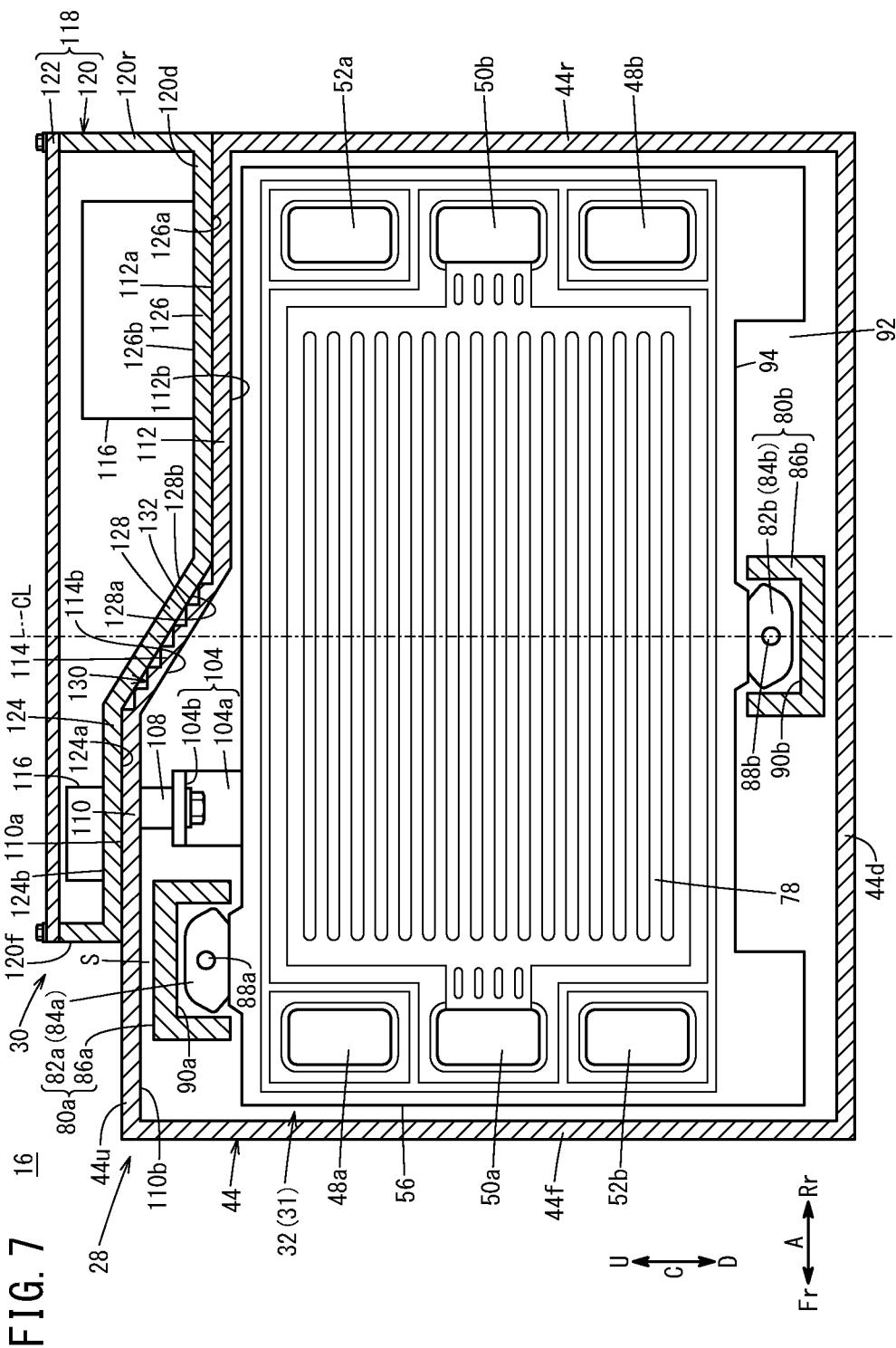
FIG. 7 is a view showing an outer surface coupling part according to a modified embodiment.

The present invention is not limited to the structure described above. The outer surface of the upper wall 44*u* of the stack case 44 may have an outer surface coupling part 130 shown in FIG. 7 instead of the outer surface coupling part 114*a* described above. As shown in FIG. 7, this outer surface coupling part 130 has a plurality of steps 132, from the first outer surface 110*a* toward the second outer surface 112*a*.

The steps 132 extend the entire length of the outer surface coupling part 130 in the direction indicated by the arrow B (vehicle width direction which is a direction perpendicular to the surface of paper in FIG. 7). In the structure, it is possible to comparatively increase the space S outside the outer surface coupling part 130. In FIG. 7, a contact surface coupling part 128*a* may have a plurality of steps corresponding to the steps 132 in a manner to contact the outer surface coupling part 130.

The present invention is not limited to the above described embodiment. Various modifications may be made without departing from the gist of the present invention.

The above embodiment can be summarized as follows:

The above embodiment discloses the fuel cell system (16). The fuel cell system (16) includes the fuel cell stack (28) and the stack case (44). The fuel cell stack (28) has the cell stack body (32) formed by stacking the plurality of power generation cells (31) together in the stacking direction. Each of the power generation cells (31) includes the separator (56, 58). The tab (82*a*, 84*a*) protruding outward is provided in the outer marginal portion of the separator (56, 58). The power generation cell (31) has the width direction perpendicular to the stacking direction of the cell stack body (32) and the protruding direction in which the tab (82*a*, 84*a*) protrudes. The outer surface of the cover (44*u*) of the stack case (44) located in the protruding direction in which the tab (82*a*, 84*a*) protrudes includes the first outer surface (110*a*) which is positioned on one end side in the width direction of the power generation cell (31), the second outer surface (112*a*) which is positioned on the other end side in the width direction of the power generation cell (31) and which is positioned more toward the cell stack body (32) than the first outer surface (110*a*) is, and the outer surface coupling part (114*a*, 130) coupling the first outer surface (110*a*) and the second outer surface (112*a*) together. The space (S) is formed between the cell stack body (32) and a portion (110) of the cover (44*u*) where the first outer surface (110*a*) is provided, and the tab (82*a*, 84*a*) and the bus bar (102, 104) configured to supply electrical power generated by the power generation cell (31) to the outside are disposed in the space (S).

The fuel cell system (16) may include the electrical equipment unit (30) provided on the cover (44*u*), the electrical equipment unit (30) may include a unit body (116) electrically connected to the bus bar (102, 104), and the unit case (118) disposed on the cover (44*u*) to accommodate the unit body (116), and the surface of the unit case (118) facing the cover (44*u*) may include the first contact surface (124*a*) configured to be in contact with the first outer surface (110*a*), the second contact surface (126*a*) configured to be in contact with the second outer surface (112*a*), and the contact surface coupling part (128*a*) configured to couple the first contact surface (124*a*) and the second contact surface (126*a*) together.

In the fuel cell system (16), the outer surface coupling part (114*a*) may include the inclined surface inclined continuously toward the cell stack body (32), from the first outer surface (110*a*) to the second outer surface (112*a*).

In the fuel cell system (16), the plurality of steps (132) may be formed in the outer surface coupling part (130), from the first outer surface (110*a*) toward the second outer surface (112*a*).

In the fuel cell system (16), the tab (82*a*, 84*a*) and the bus bar (102, 104) may be provided at positions shifted toward one end in the width direction of the power generation cell (31) from the center in the width direction of the power generation cell (31).

In the fuel cell system (16), the tab (82*a*, 84*a*) is located more toward the one end in the width direction of the power generation cell (31) than the bus bar is, and one end of the unit case (118) in the width direction of the power generation cell (31) is located more toward the bus bar (102 104) than one end of the tab (82*a*, 84*a*) in the width direction of the power generation cell (31).

In the fuel cell system (16), the tab (82*a*, 84*a*) may comprise the first tab (82*a*, 84*a*), the recess (92, 96) depressed toward the first tab (82*a*, 84*a*) may be formed in the outer marginal portion (56*d*, 58*d*) of the separator (56, 58) opposite to the first tab (82*a*, 84*a*), and the bottom (94, 98) of the recess may be provided with the second tab (82*b*, 84*b*) protruding opposite a direction in which the first tab (82*a*, 84*a*) protrudes.

The above embodiment discloses the fuel cell vehicle (10). The fuel cell vehicle (10) may include the fuel cell system (16) described above, the front box (14) provided on the vehicle front side of the dashboard (12), and the cowl top (18) provided at the upper end of the dashboard (12), the fuel cell system (16) may be accommodated in the front box (14) in a manner that the stacking direction of the cell stack body (32) is oriented in the vehicle width direction, and the cover (44*u*) serves as the upper wall (44*u*) of the stack case (44), the second outer surface (112*a*) may be positioned more rearward than the first outer surface (110*a*), and the upper end of the fuel cell system (16) on the vehicle rear side is positioned below a lower end of the cowl top (18).

What is claimed is:

1. A fuel cell system comprising:
a fuel cell stack having a cell stack body formed by stacking a plurality of power generation cells together in a stacking direction, the power generation cells each including a separator; and
a stack case configured to accommodate the fuel cell stack,
wherein a tab protruding outward is provided in an outer marginal portion of the separator,
and wherein the power generation cell has a width direction perpendicular to the stacking direction of the cell stack body and a protruding direction in which the tab protrudes;
an outer surface of a cover of the stack case located in the protruding direction in which the tab protrudes includes:

a first outer surface which is positioned on one end side in the width direction of the power generation cell;
a second outer surface which is positioned on the other end side in the width direction of the power generation cell and which is positioned more toward the cell stack body than the first outer surface is; and
an outer surface coupling part coupling the first outer surface and the second outer surface together, and
space is formed between the cell stack body and a portion of the cover where the first outer surface is provided, and the tab and a bus bar configured to supply electrical power generated by the power generation cell to the outside are disposed in the space.

2. The fuel cell system according to claim 1, comprising an electrical equipment unit provided on the cover,
wherein the electrical equipment unit comprises:
a unit body electrically connected to the bus bar; and
a unit case disposed on the cover to accommodate the unit body,
and wherein a surface of the unit case facing the cover includes:
a first contact surface configured to be in contact with the first outer surface;
a second contact surface configured to be in contact with the second outer surface; and
a contact surface coupling part configured to couple the first contact surface and the second contact surface together.

3. The fuel cell system according to claim 2, wherein the outer surface coupling part comprises an inclined surface inclined continuously toward the cell stack body, from the first outer surface to the second outer surface.

4. The fuel cell system according to claim 2, wherein a plurality of steps are formed in the outer surface coupling part, from the first outer surface toward the second outer surface.

5. The fuel cell system according to claim 2, wherein the tab and the bus bar are provided at positions shifted toward one end in the width direction of the power generation cell from the center in the width direction of the power generation cell.

6. The fuel cell system according to 5, wherein the tab is located more toward the one end in the width direction of the power generation cell than the bus bar is; and
one end of the unit case in the width direction of the power generation cell is located more toward the bus bar than one end of the tab in the width direction of the power generation cell.

7. The fuel cell system according to claim 1, wherein the tab comprises a first tab;
a recess depressed toward the first tab is formed in an outer marginal portion of the separator opposite the first tab; and
the bottom of the recess is provided with a second tab protruding opposite a direction in which the first tab protrudes.

8. A fuel cell vehicle comprising:
a fuel cell system comprising:
a fuel cell stack having a cell stack body formed by stacking a plurality of power generation cells together in a stacking direction, the power generation cells each including a separator; and
a stack case configured to accommodate the fuel cell stack,
wherein a tab protruding outward is provided in an outer marginal portion of the separator,
and wherein the power generation cell has a width direction perpendicular to the stacking direction of the cell stack body and a protruding direction in which the tab protrudes;
an outer surface of a cover of the stack case located in the protruding direction in which the tab protrudes includes:
a first outer surface which is positioned on one end side in the width direction of the power generation cell;
a second outer surface which is positioned on the other end side in the width direction of the power generation cell and which is positioned more toward the cell stack body than the first outer surface is; and
an outer surface coupling part coupling the first outer surface and the second outer surface together, and
space is formed between the cell stack body and a portion of the cover where the first outer surface is provided, and the tab and a bus bar configured to supply electrical power generated by the power generation cell to the outside are disposed in the space,
the fuel cell vehicle further comprising:
a front box provided on a vehicle front side of a dashboard; and
a cowl top provided at an upper end of the dashboard,
wherein the fuel cell system is accommodated in the front box in a manner that the stacking direction of the cell stack body is oriented in the vehicle width direction and the cover serves as an upper wall of the stack case;
the second outer surface is positioned more rearward than the first outer surface; and
an upper end of the fuel cell system on the vehicle rear side is positioned below a lower end of the cowl top.

* * * * *